United States Patent [19]

Kitchener et al.

[11] 3,922,532

[45] Nov. 25, 1975

[54] CELL COUNTER

[75] Inventors: William R. Kitchener, Huntington; Stephen L. Sama, Seaford; Walter E. Tolles, Oyster Bay, all of N.Y.

[73] Assignee: Artek Systems Corporation, Farmingdale, N.Y.

[22] Filed: Mar. 14, 1975

[21] Appl. No.: 558,486

[52] U.S. Cl. ... 235/150.3; 178/DIG. 36; 235/92 PC

[51] Int. Cl.² .................... G06M 11/02; H04N 7/18

[58] Field of Search .......... 235/151.3, 150.3, 92 PC; 178/DIG. 36; 356/39; 340/324

[56] References Cited

UNITED STATES PATENTS

| | | | |
|---|---|---|---|
| 3,714,372 | 1/1973 | Rosen et al. | 178/DIG. 36 X |
| 3,720,812 | 3/1973 | Downs | 235/92 PC |
| 3,780,223 | 12/1973 | Perry | 178/DIG. 36 X |
| 3,801,741 | 4/1974 | Ablett | 178/DIG. 36 X |
| 3,805,028 | 4/1974 | Morton | 235/92 PC |
| 3,811,036 | 5/1974 | Perry | 235/92 PC |
| 3,819,913 | 6/1974 | Carter et al. | 235/92 PC |

*Primary Examiner*—Edward J. Wise
*Attorney, Agent, or Firm*—Leonard H. King

[57] ABSTRACT

An automatic cell counter which includes a video camera for viewing a sample being scanned. The video output is quantized by means of a level detector which compensates for variations and non-uniformities of the background field and produces a signal identifying a cell as having a certain absorption relative to a preselected absorption level. The quantized signal from the level detector passes through a discriminator which produces an output flag for each cell having a predetermined size level. Thus, cells can be selected having a combination of predetermined size and absorption levels. By utilizing line to line comparison, a single flag is provided for each cell desired to be counted. The flags are counted and the entire video output is displayed with the flag superimposed upon each cell counted.

20 Claims, 19 Drawing Figures

CELL COUNTER

This invention is being filed concurrently with copending application Ser. No. 558,487 entitled LEVEL DETECTOR CIRCUIT and assigned to the same assignee of the present invention. The concurrently filed Application describes and claims the level detector which is used in the present invention as part of an overall system.

The aforementioned abstract is neither intended to define the invention of the application which, of course, is measured by the claims, nor is it intended to be limiting as to the scope of the invention in any way.

FIELD OF THE INVENTION

This invention relates to a selective counter of cellular events and more particularly to a cell counter which can be controlled to count and display cells of a preselected combination of size and absorption levels.

BACKGROUND OF THE INVENTION

In medical research it is frequently necessary to display and count various specimens. One such type of counter which is used is a micro-biological colony counter as described in U.S. Pat. No. 3,811,036, assigned to the assignee of the present invention. Such counter, as well as other counters, generally work on a macroscopic scale wherein it is desired to count the number of colonies formed on a medium such as an agar dish. In such counters, it is only required to recognize a single criterion, namely the presence or absence of a contrasting edge indicating the boundary of a colony. In such devices, there is little requirement for selecting certain classes of objects to be counted based upon their size or density. On the other hand, in the field of microscopic measurements, such additional capabilities place extreme requirements on a counter. For example, it is necessary to distinguish and select certain objects based upon the criteria of size, optical density, density gradient, chromaticity as well as other criteria, and in addition, it is required to count these objects with great speed. Furthermore, the size of the objects being counted are much smaller as compared to the colonies being counted in a bacterial colony counter. As a result, the effect of the background plays a large role in being able to properly select the desired cell to be counted. Utilizing standard scanning devices, such as television cameras, there results a non-uniform sensitivity to illumination. Typically, the camera sensitivity slopes downward towards the edges of the field of view. Additionally, when an illumination source, such as a bulb, is changed, there results a different level of background illumination. Such prior art systems utilize memories to record the background field of illumination and to judge and determine the density of the desired cell to be measured relative to the background illumination. By changing the illumination source it is then required to rememorize the background field and constantly check it, to be sure no change has resulted during continued use of the illumination source.

Micro counters find many uses in connection with the field of cytology, histology, and hematology. In medical research laboratories, hospitals as well as in commercial clincial laboratories, there are frequent requirements for utilizing such counters as part of routine diagnostic tests as well as advanced research. Heretofore, prior art cell counter devices have not been able to adequately meet the requirements of such uses.

Accordingly, it is an object of the present invention to provide an automatic cell counter which avoids the aforementioned problems of prior art devices.

Another object of the present invention is to provide an automatic cell counter which gives a read-out from a specimen medium of the number of cells having a preselected cell-size and absorption.

Yet a further object of the present invention is to provide an automatic cell counter which permits selection of a predetermined range of sizes and absorptions of cells to be counted.

Yet another object of the present invention is to provide an automatic cell counter which provides a video display of the sample scanned together with an illuminated dot automatically superimposed over the cells which have been selected to be counted.

Still another object of the present invention is to provide a cell counter which gives an output count of the number of cells within a preselected size and absorption range, such that the output can be further used as input information to a computer or a print-out system.

A further object of the present invention is to provide a cell counter which compensates for non-uniform field illumination present in the background field.

Another object of the present invention is to provide a cell counter which automatically compensates for inherent deficiencies in the uniformity of video camera sensitivity.

A further object of the present invention is to provide a cell counter which permits selection from a large sample, of a particular area to be counted.

Still another object of the present invention is to provide an automatic cell counter which permits selection of a size and absorption level and further permits selection of the cells having a particular combination of the size and absorption levels.

Still a further object of the present invention is to provide a cell counter which can be utilized in all fields of microscopic counting including such fields as cytology, histology and hematology.

Yet a further object of the present invention is to provide a cell counter which provides only a single output count for each cell designed to be counted by comparing the scanned information on a line by line basis.

A further object of the present invention is to provide an automatic cell counter which is more efficient, more sensitive and more accurate than heretofore known devices.

These and other objects, features and advantages of the invention will, in part, be pointed out with particularity, and will, in part, become obvious from the following more detailed description of the invention taken in conjunction with the accompanying drawings, which form an integral part thereof.

BRIEF DESCRIPTION OF THE INVENTION

Briefly, the invention is a cell counting apparatus for counting cells contained in a sample, the apparatus including a video means focused onto the sample for providing a video output of the sample as a sequence of horizontal scan lines. The video output is sent to a level detector which provides, for each horizontal line scanned, a first signal containing all the quantized image information of the cells scanned on that line, and a second signal containing the quantized image information of cells scanned on that line which have absorptions greater than a preselected absorption level. An absorption selection means is coupled to the level detector for setting the preselected absorption level. A discriminator means receives the first and second signals and processes them to provide a size and absorption information signal which is compared to a preselected size level and in accordance with a preselected combination of size and absorption factors a flag output is produced. A size selection means is coupled to the discriminator means for setting the preselected size level. Counting means is coupled to the discriminator means for counting the number of flag outputs produced. A timing control means synchronizes the operation of the discriminator means and the video means.

In a further embodiment of the invention, the video output and the flag output are combined in a amplifier and displayed. The video output is passed through a delay means whereby the display of the scanned sample will occur in real time with the superimposed flag signal on each cell counted.

In addition to using the size and absorption criteria, other logic could be utilized with the present invention, such as the edge detector circuit of the colony counter as described in the aforementioned patent.

BRIEF DESCRIPTION OF THE DRAWING

In the accompanying drawings, in which is shown one of the various possible embodiments of the invention.

In the various figures of the drawings, like reference characters designate like parts.

DESCRIPTION OF THE PREFERRED EMBODIMENTS

Figures 1, 2A, 2B, 2C:
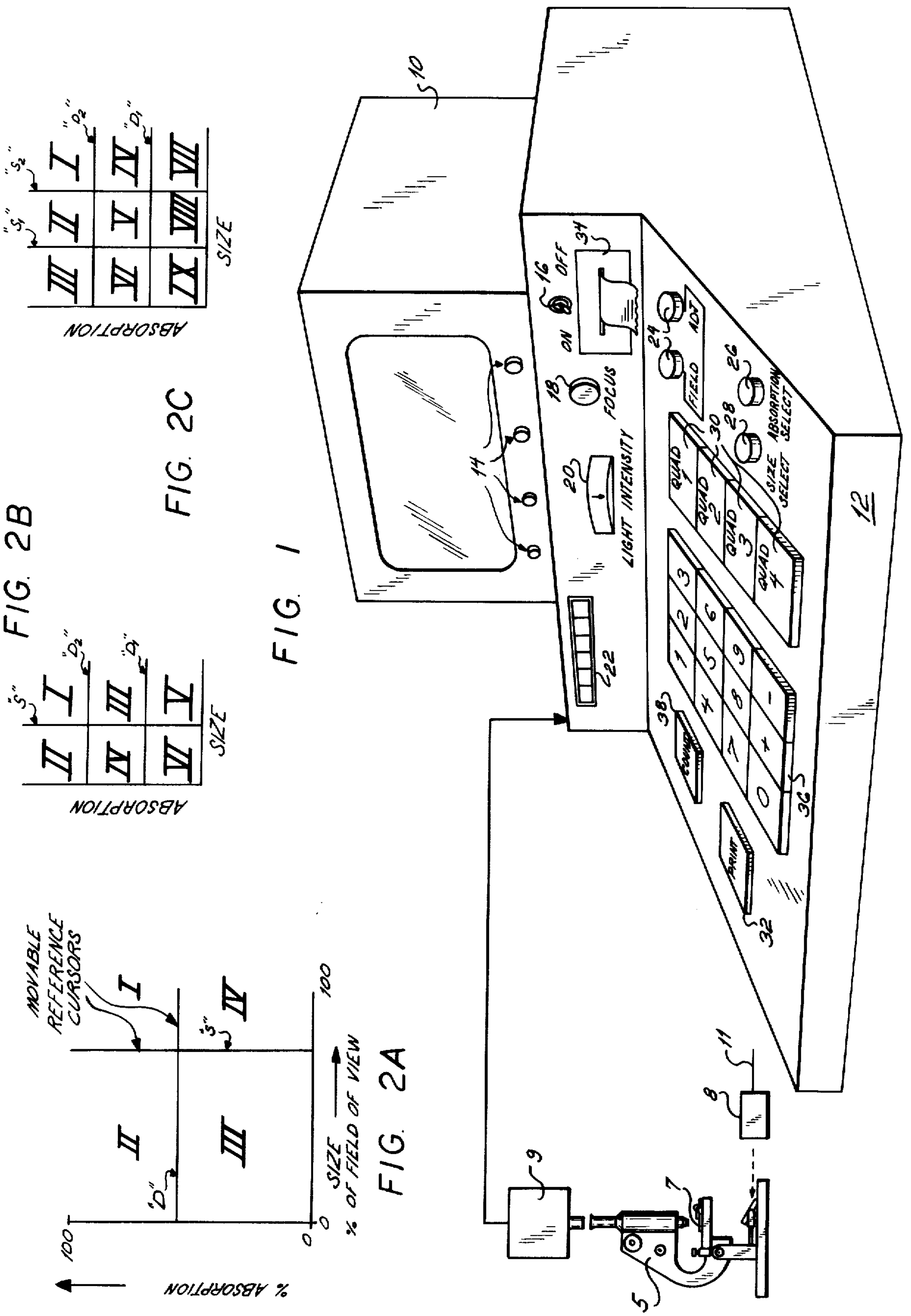
FIG. 1 is a pictorial representation of the cell counter apparatus.
FIGS. 2A, 2B and 2C are graphs useful in explaining the operation of the cell counter of the present invention.

Referring now to FIG. 1, there is shown a pictorial view of the apparatus of the present invention including a microscope 5, a slide 7 to be viewed positioned in the microscope, a microscope illuminator 8 and a video camera 9. Preferably the light source 8 includes a variably controlled light filter for controlling the incidential light wavelength for providing selective control of certain colored cells or cell parts. Control 11 schematically indicates means for varying the frequency.

The slide image is displayed on the monitor unit shown generally at 10 and which is generally mounted directly on the control unit as shown generally at 12. The knobs 14 on the monitor unit 10 are various knobs for adjustment of the picture on the monitor screen. On the control unit 12 is located the main on/off switch 16 and the focusing knob 18. A light intensity indicator 20 provides a warning as to excessive amount of light intensity on the camera unit. The digital output 22 indicates the count provided by the apparatus. The scan-adjusting knobs 24 are available for selecting the X and Y coordinates of a window when a small area from the total sample is desired to be counted and displayed. An absorption-select knob 26 is available for setting the absorption level of the cells to be counted and displayed. A size-select knob 28 is available for selecting the size of the cells to be counted, and displayed. Quadrant select switches 30 are shown relating to the four positions available representing the four combinations possible with the two variables, namely the density level and the size level. These switches determine the class of cells to be counted, as will hereinafter be explained. A count button 38 is available when the amount of count is desired to be displayed on the digital readout 22. A print button 32 is available when the amount of the count is desired to be printed out from the print-out 34. A keyboard 36 is also provided to provide arithmetic input signals and instructions to the apparatus.

In a cell counter, it is generally necessary to count particular classes of cells having a required amount of size and a specified density. Size and density will be determined in the present invention as relative parameters rather than absolute magnitudes. Thus, referring to FIG. 2 it is noted that the optical density is measured as a percent absorption of light of a particular object and ranges from zero to one hundred percent. Similarly, size of objects will be determined as a percent magnitude of the diameter of the circular field of view, and also ranges from zero to one hundred percent. In order to set the desired levels, movable reference cursors "D" and "S" are utilized to respectively set the level of the absorption and the level of the size. It is noted, however, that with regard to each of the levels, the object may be classified as being greater or less than the level. Thus, with regard to the S cursor which sets the threshold level of size, objects could have a size greater than the threshold level and fall within the quadrants I and IV or have a size less than this threshold and fall into the quadrants II and III. Similarly, with regard to the D cursor, objects having an absorption less than this threshold would fall into the quadrants III and IV while objects having an obsorption greater than the threshold would fall into catagories I and II. It is therefore possible, by setting the cursor at specified levels and selecting the particular quadrant, to count and display objects having a particular combination of size and density. Furthermore, nonuniform objects may be plotted with multiple points or actual regions of a quadrant or quadrants. The front panel controls 26, 28 shown in FIG. 1, are available to set the S and D cursors while the quadrant selector switches 30 on the front panel are used to select the quadrant desired.

Figure 3:
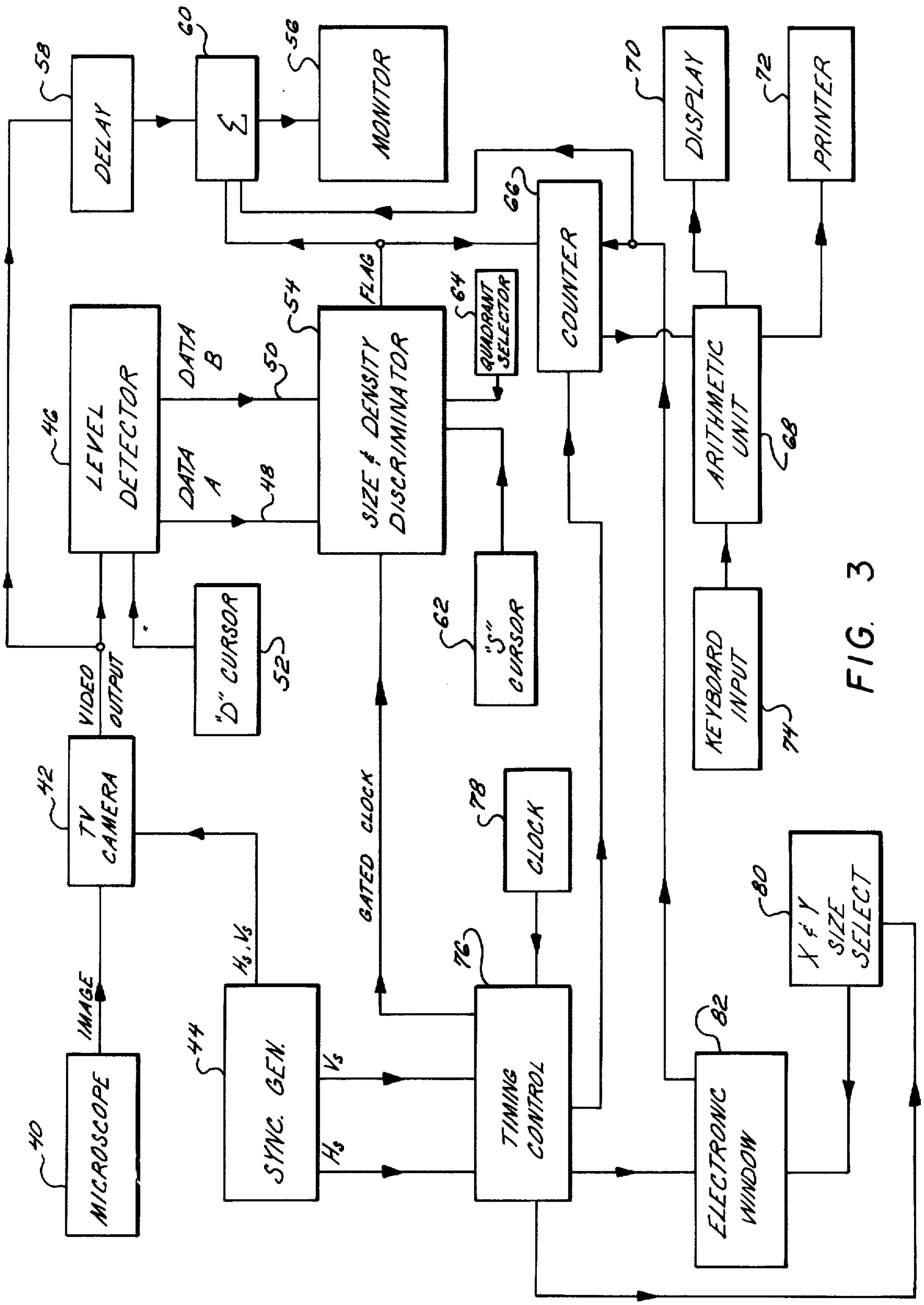
FIG. 3 is a schematic block diagram of the overall circuitry of the system.

Referring now to FIG. 3, there is shown a schematic block diagram for providing the cell counter of the present invention which carries out the aforementioned variable settings of the absorption and size cursors and the quadrant selection. Since the sample to be scanned and counted is generally of extremely small size, it will be viewed through a microscope 40 which is connected to the video scan device 42, typically a television camera. The camera, of a well-known type, scans the image along a sequence of horizontal scan lines and provides a video output of the information scan. The camera scan is controlled by the horizontal and vertical synchronous generator 44 which provides a typical 2 to 1 interlaced synchronous pattern.

The video output from the camera is directed to the level detector circuit 46. This circuit extracts the useful image information and quantizes the information onto two data lines represented as data A on line 48, and data B on line 50. Data A includes all of the quantized image information processed by the level detector. Data B, on the other hand, contains all of the quantized information greater in absorption than the level selected by the D cursor selector 52 coupled to the level detector 46. The data outputs A and B are routed to a size and density discriminator circuit 54. The video output from the camera is also routed to a TV monitor 56 by means of a delay circuit 58 and a summing amplifier 60.

The size and density discriminator 54 operates on the data A and data B information to form a size and density information signal and compares this last signal with a size cursor S which is set by means of the S size cursor unit 62 coupled to the discriminator 54. The quadrant selector 64, also coupled to the discriminator, determines which of the four quadrants should be counted and flagged. After comparing with the S cursor, those cells falling within the quadrant selected each produce a flag output which is counted on the counter 66. The counter 66 sums the number of flags received during the count window, and directs the count to the arithmetic unit 68. The arithmetic unit 68 divides the flag count by the number of fields received during the count window. Thus, if the field is counted *n* times during a particular count window, the total number of the flag count will be divided by *n* to determine the average number of the count. This averaging technique insures a more accurate result. The count thus derived from the arithmetic unit is displayed on the output display 70 as a digital value. The output can also be printed on a paper tape record through the printer 72, or alternately the information can be sent to a computer for further calculations. A keyboard 74 is provided in conjunction with the arithmetic unit to permit the addition or subtraction of counts to the display and the printer. The keyboard 74 is also used for coding the count to the printer, or other computer instrument which may be added, by providing instructions to the arithmetic unit. The coded count will be displayed on the display 70 along with the object count.

The flag output is also sent to the summing amplifier 60 so that the monitor 56 will display the scanned sample and will place an illuminating dot on each of the cells which have been counted. The illuminating dot will appear simultaneously with the output display of the sample scanned as a result of the delay which insures that the sample scanned will appear in real time with the flag illuminating dots.

The timing control unit 76 receives the horizontal and vertical sync pulses from the sync generator 44 as well as clock pulses from the master clock 78. The timing unit 76 gates the clock pulses to the size and density discriminator 54 for a period occurring within the timing of one horizontal scan line. Typically, this would consist of 256 clock pulses.

If a particular smaller area of the total scanned area is desired to be viewed, the X and Y size select unit 80 can be utilized by means of front panel controls to identify the particular window which is to be scanned. This reduces the area within which the information is flagged and counted. The X and Y size select circuit 80 receives the timing pulses from the timing control 76 and generates an electronic window 82 which is sent to the summing amplifier 60 so that it will intensify the perimeter of the area within the window. The electronic window will also control the counter 66 so that flags are only counted and displayed within the desired window area.

Utilizing the circuit as shown in FIG. 3, the cell counter will provide an output count of the number of cells in accordance with a preselected absorption level and size level and in conjunction with a preselected quadrant determined by these two levels. Furthermore, a smaller area of the total sample can be selected so that the count will only occur within the window area. The scanned area will appear on the monitor along with an illuminating dot indicating which of the cells have been counted.

In an attempt to determine the proper absorption level, numerous problems are encountered. Utilizing a television scan camera, the sensitivity of the camera does not provide a flat uniform level throughout the field of view. Also, when the illumination source changes as after continued use of a source which deteriorates with age, the background field of illumination changes. Since absorption levels to be distinguished are extremely close to each other, it is necessary to have an accurate level detector which can compensate for non-uniformities in the field of illumination and for the irregularities in the television scanning camera.

The initial sensing of an object as a television camera scan line crosses its image, usually causes a decrease in video voltage level resulting from an increase in the optical density of the light path encountered compared to normal transmission. It would therefore seem apparent that in a level detector there should be a uniform absorption level preset which can be utilized as a threshold level in determining the absorption of the object. However, as indicated, the irregularities in the field of view cause the video signal to slope downward toward the edges of the field of view which would interfere with a flat absorption level threshold. It is therefore necessary to compensate for those sloping edges and furthermore to compensate for changes which may occur in the background field of illumination. The level detector of the present invention provides an improved circuit which solves these problems.

Figure 4:
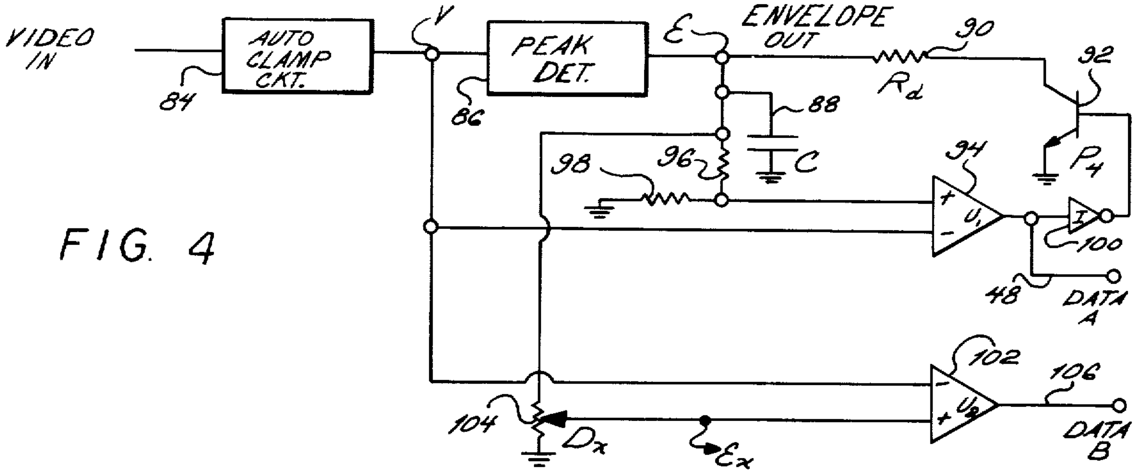
FIG. 4 is a schematic block diagram of the level detector.

As shown in FIG. 4, the video input from the television camera is first sent to an automatic clamp circuit 84 which sets the zero video input signal at ground level regardless of the DC level of the video signal itself and regardless of the magnitude of the video signal. The clamped output signal indicated as V is then routed to a peak detector 86. The output of the peak detector has a capacitor 88 coupled across it with a resistor 90 in series with a transistor 92, in parallel across the capacitor 88. When the transistor 92 is turned on, the resistor 90 provides a discharging circuit for the capacitor 88. When the transistor 92 is turned off, the voltage of the capacitor 88 is held at its value without charging or discharging any further. The output of the peak detector is indicated as the voltage E.

A comparator 94, including a differential amplifier $U_1$ receives at its negative input the voltage V which is the clamped video input. The positive input of the amplifier $U_1$ is the voltage E passed through a voltage divider including resistors 96 and 98, such that a fixed fraction of the peak detector output signal E is utilized. The comparator 94 in conjunction with transistor 92 forms a feedback loop to the peak detector 86. As the video signal slowly increases, as for example near its edges, the output voltage E of the peak detector 86 causes the voltage across the capacitor 88 to increase so that the output voltage E of the peak detector follows exactly the input video signal V. The capacitor 88 can discharge through the resistor 90 as long as the transistor 92 is in an on state. When a relatively dense object is scanned and a sudden voltage drop occurs in the video signal V, the comparator 94 will detect this drop producing an output pulse on line 48 which represents the data A signal. This output pulse is inverted by the inverter 100 which serves to turn off the transistor 92 thereby removing the resistor 90 as a discharge resistor for the capacitor 88. The voltage E will therefore be held at its value and the peak detector 86 in conjunction with comparator 94 will serve as a true peak detector to provide an output pulse for the large negative voltage representing a dense object. Thus, the combination of the peak detector with the feedback loop essentially provides a "sample and hold" circuit which permits sampling of the video signal during its normal scanning, and holding of a fixed output threshold level during the detection of dense objects. The output signal E therefore effectively provides an "envelope" of the video input signal.

A second comparator 102 including an amplifier $U_2$ is also included and has the voltage V serving as the input to its negative terminal. The positive terminal of the amplifier $U_2$ to the comparator is a preselected fraction of the envelope voltage E. The fraction is provided by the variable voltage divider Dx 104. The positive input Ex therefore represents a variable envelope of the video input signal whose magnitude is determined by the variable voltage divider 104 providing the D cursor for presetting the desired density level. The output of the comparator 102 appears on line 106 as data B and represents a digitized pulse recognition of all objects having an absorption greater than the preset absorption level. By adjusting the divider 104 the D cursor can discriminate objects of various absorption levels independent of the local sensitivity of the camera. Furthermore, by utilizing the percent optical transmission of an object the system becomes insensitive to absolute optical light level or overall camera gain, thereby permitting the camera to operate in an optimal region.

Figure 5A:
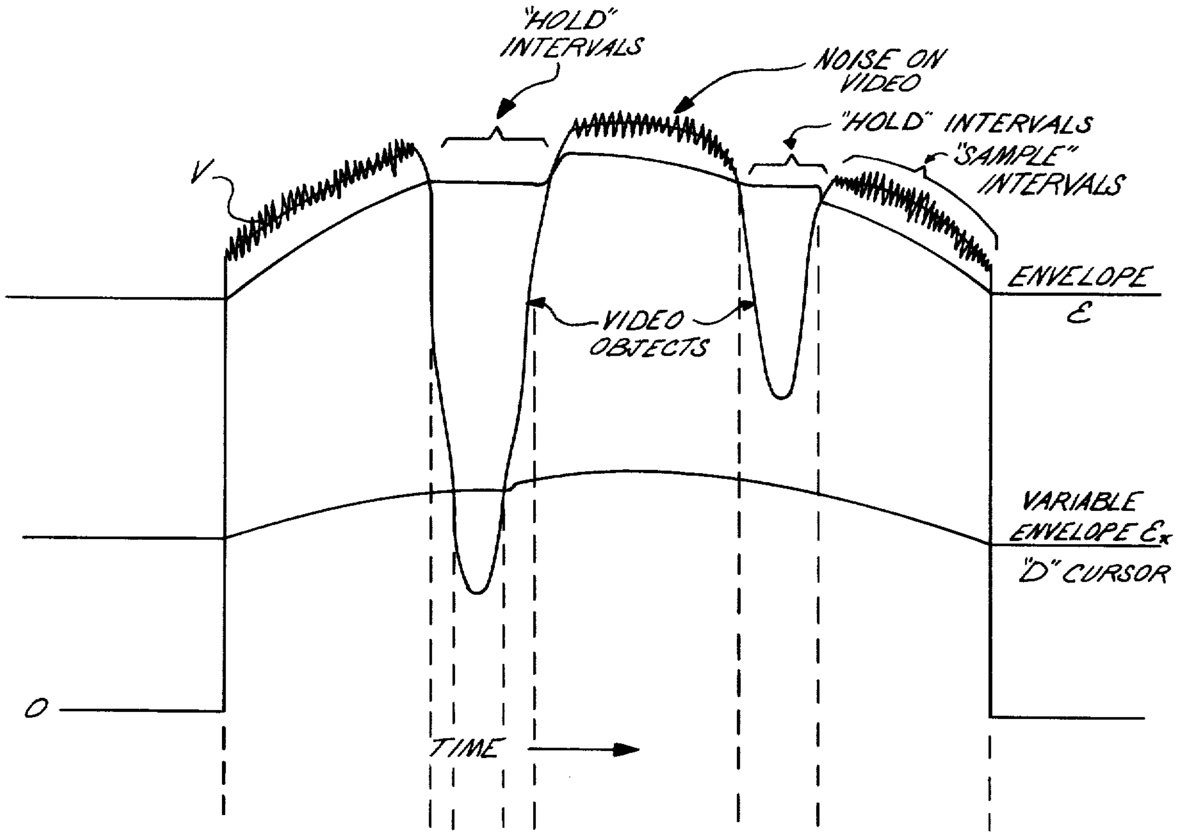
FIGS. 5A and 5B represent graphs useful in explaining the operation of the level detector shown in FIG. 4.
Figure 5B:
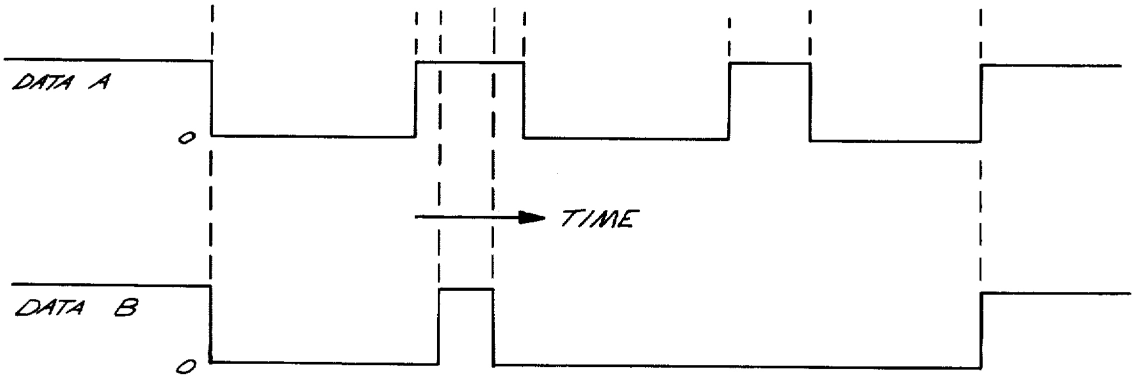

Referring now to FIGS. 5A and 5B, there are shown a series of graphs which will aid in the understanding of the operation of the level detector of FIG. 4. In 5A, there is shown a part of the video voltage which has been clamped so that its zero level is at ground. It is noted that the video signal is not at a uniform level but slopes downward towards its edges. Furthermore, it is noted that there is noise signal on the video. The envelope signal E effectively tracks the video signal and samples it during its normal scanning. When a dense object is detected, the output of the envelope E will be held and, as seen in FIG. 5B, the data A output will detect all of the image information for the complete video object. The variable envelope Ex developed by the D cursor is at a threshold level whereby only much denser objects will be detected. The output due to the envelope Ex is shown as the narrower pulse data B. After the video object is detected, the envelope E continues to sample the video signal and again tracks its path. It is further noted that the envelope E is slightly spaced from the video signal so that the noise signal on the video will not interfere with detection.

Figure 6:
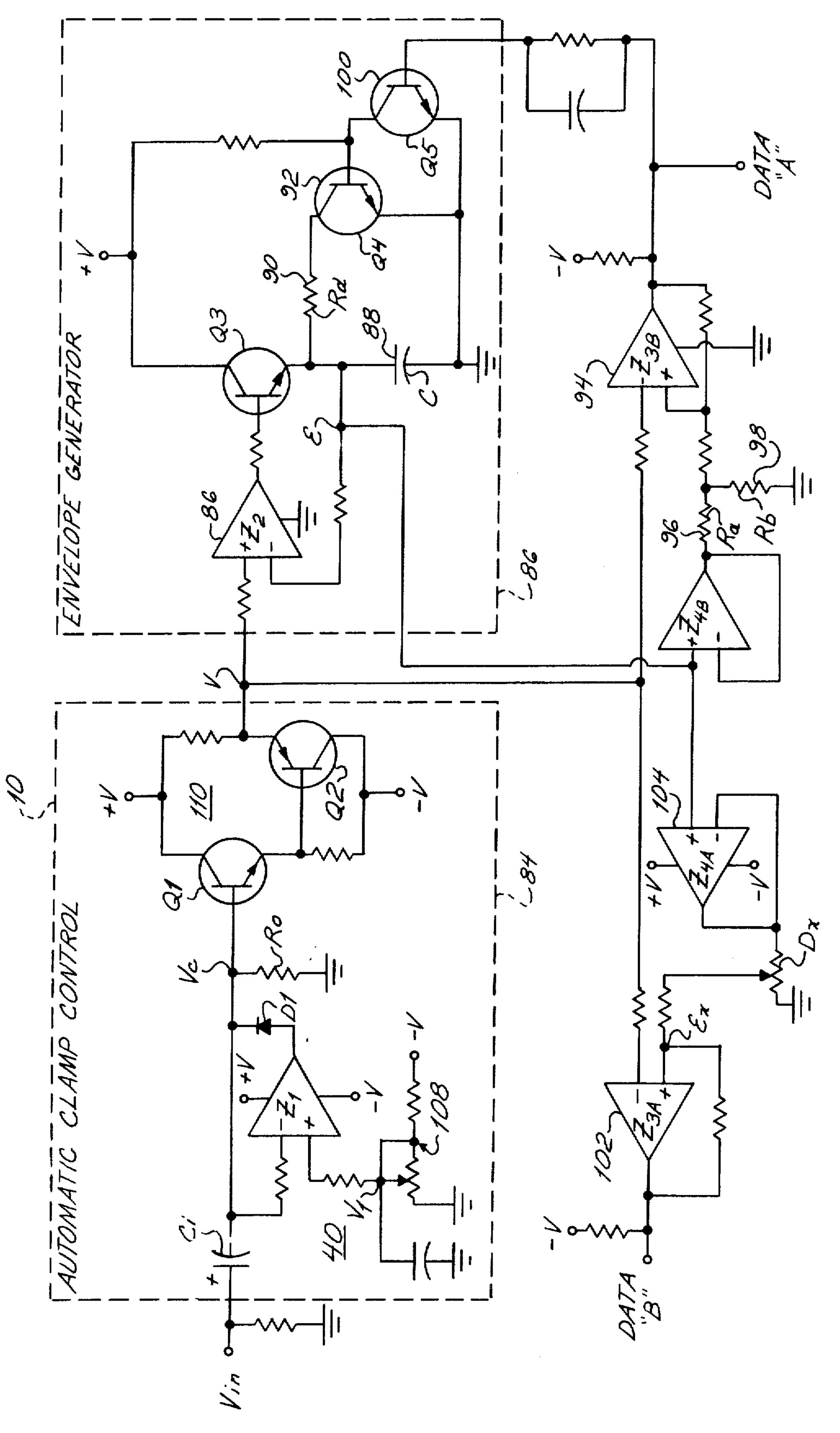
FIG. 6 is a detailed circuit diagram of the level detector shown in FIG. 4.

Referring now to FIG. 6, there is shown a detailed circuit diagram of the level detector shown generally in FIG. 4. Part of the automatic clamp control circuit 84, C1, AC couples the video input Vin, to a point Vc taken across the resistor Ro. The DC component of the Vin is removed by means of the capacitor C1. As a result, Vc will swing above and below zero voltage. The amplifier $Z_1$ examines the voltage Vc at its negative input and compares it to a negative reference voltage $V_1$ taken across the voltage divider shown generally at 108. Should the voltage Vc attempt to go more negative than the voltage $V_1$, the operational amplifier $Z_1$ will drive the Vc positive through the diode D1. This will force voltage Vc to become the AC component of Vin with its negative most point at $V_1$ volts. As a result, any video input voltage is level-shifted so that the zero video signal corresponds to zero ground voltage. Furthermore, if the time constant of C1 and Ro is made large, the operational amplifier $Z_1$ need only supply a small correction charge to the C1 capacitor periodically at large time intervals. This makes the speed requirements for $Z_1$ minimal and contributes to the overall stability of the circuit.

The voltage Vc then passes through a buffer amplifier shown generally at 110 to provide a low impedance drive at the point V which represents the clamped video input signal and serves as the input for the level detecting circuit. The buffer amplifier 110 comprises transistors Q1 and Q2 which serve as a simple, temperature compensated, gain of one, high-frequency buffer amplifier.

The voltage V serves as the input to the peak detector shown generally at 86 and including the amplifier $Z_2$. The output of the amplifier $Z_2$ feeds the capacitor C through a transistor Q3. The resistor Rd and the transistor Q4 are placed in parallel across the capacitor C. These latter three components represent respectively corresponding components of FIG. 4 identified as 88, 90, and 92. The comparator 94 includes the amplifier $Z_{3B}$ having its negative input coupled to the video signal V and its positive signal coupled to the envelope signal E. The envelope is slightly divided down by means of the amplifier $Z_{4B}$ and the voltage dividing resistors Ra, Rb. The background noise present on V is thereby eliminated from detection by $Z_{3B}$. Generally, the transistor Q4 will be on, placing the resistor Rd in parallel with the capacitor C and permitting the capacitor C to be discharged through the resistor Rd. The output voltage E from the peak detector $Z_2$ and Q3 will therefore effectively track the voltage video signal Vc and will be slightly spaced therefrom, to thereby "sample" the signal. This sampling is achieved by charging the capacitor C through Q3 whenever the voltage across C is less than V, and discharging the capacitor C through Rd as the voltage V decreases slightly. Whenever the voltage V at the input of $Z_{3B}$ dips below the positive input of that amplifier, due to the presence of a dense object in the field of view, the output of the amplifier $Z_{3B}$ goes high thereby turning on the transistor Q5 and turning off the transistor Q4. Rd is then disconnected from the capacitor C and the capacitor C can no longer discharge but is held at its voltage. The comparator 94 will therefore provide pulses at the output data A which represent all of the objects scanned.

The envelope E is a true envelope of the video signal V with V being sampled by the amplifier $Z_2$ and the transistor Q3 during background light portions, and with E being "held" during an object portion as detected by $Z_{3B}$.

In addition to the digital signal data A, an absorption cursor D is provided which produces an output signal data B. This is accomplished by utilizing an additional comparator 102 comprising the amplifier $Z_{3A}$ whose negative input is the video signal V and whose positive input is taken through the D cursor circuit 104. This last circuit includes the amplifier $Z_{4A}$ and the variable voltage divider Dx. By setting the variable divider Dx at a predetermined value, the absorption threshold can be selected so that the output signal data B consists of a selective detection of objects denser than the preselected absorption threshold level.

It is noted that the cursor or variable reference envelope Ex developed by the amplifier $Z_{4A}$ and the variable resistor Dx, may be repeated numerous times to generate many D cursors. Each cursor in turn can work with a comparator similar to $Z_{3A}$ to provide a different group of recognized objects in each case. Logic circuitry operating on any two of these outputs can permit the identification of objects with absorptions between the two cursors creating that output. In this way a "window" of absorption levels can be obtained and objects having absorptions within this window can be discriminated and detected.

Utilizing the level detector shown in FIG. 4 or 6, objects will be detected having absorptions greater than the absorption cursor on data B and all objects having absorptions greater than a background field illumination will be detected on data A. Therefore, referring again to FIG. 2, the data A will provide objects essentially in all four quadrants while data B will provide objects in quadrants I and II. It is possible to determine all of the objects in quadrants III and IV by logically subtracting data B from data A. This will provide an effective output of actual objects.

Figure 8A:
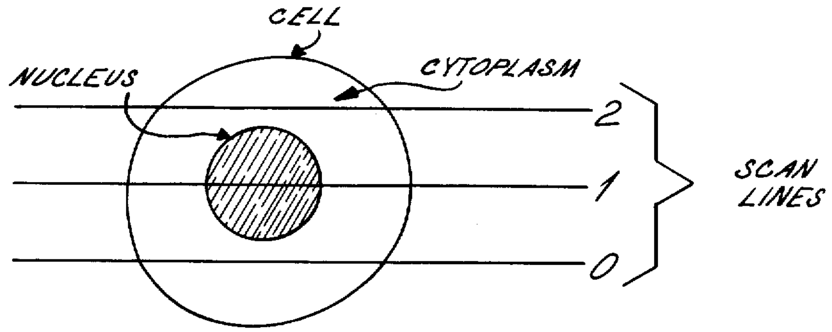
FIG. 8 is a series of graphs useful in explaining the operation of the discriminator shown in FIG. 7.
Figure 8B:
Figure 8C:
Figure 8D:
Figure 8E:
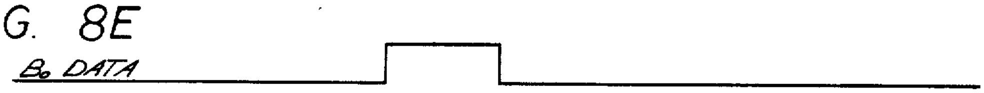

In addition to discriminating certain cells by means of their density, it is often necessary in cell counting to discriminate cells based upon their size. Size discrimination of an object is accomplished by rejecting all objects whose sizes are less than, or greater than a preset level. The ability to accurately count cells based upon their size poses many problems since a cell generally includes a nucleus and cytoplasm around it, as is shown in FIG. 8A. The cytoplasm of the cell might have very little absorption and accordingly, almost no definite edge. Furthermore, there may be a number of cells folded onto each other and discrimination is exceedingly difficult. Furthermore, the nucleus of the cell, which is generally very dense, will range in size and at some extremes may be as large as the cell itself. The method for accurate cell counting in the present invention is controlled by means of selecting the size of the cell to be counted by means of the S cursor. Furthermore, it will be possible for the operator to select and count cells which are either less than or greater than the selected S cursor level. This selection and control is carried out by means of the size and density discriminator. The discriminator operates by storing digital information detected and comparing it on a line by line basis with sequential horizontal line scans. In this manner, a single count will be provided for cells which are scanned by multiple horizontal line scans. The discriminator will not make a decision about the object until the object is decreasing in size. This is verified by comparing a given digitized horizontal line scan with the previous stored digitized line scan and determining if the present pulse width is less than the stored pulse width. Also, the discriminator will only make a decision that the size is decreasing just after the size has reached a maximum. This is verified by comparing the digitized data from the two stored consecutive scan lines and the current scan line. By utilizing this approach, it is insured that a cell will only be counted once and no duplication of count will be obtained although cells may span numerous horizontal line scans.

Additionally, the discriminator will subtract information regarding the densest part of the cell, namely the nucleus, from the maximum width of the cell to thereby obtain information representative of the cytoplasm of the cell. Also, having determined the size of the cell or a cell component this size may be compared with a reference size cursor establishing a predetermined size level. The discriminator can be preset to obtain an output either if the size of the object is greater than the size cursor, in which case the object falls in quadrants I and IV or, if the object size is smaller than the size cursor, in which case objects fall in quadrants II and III.

Figure 7:
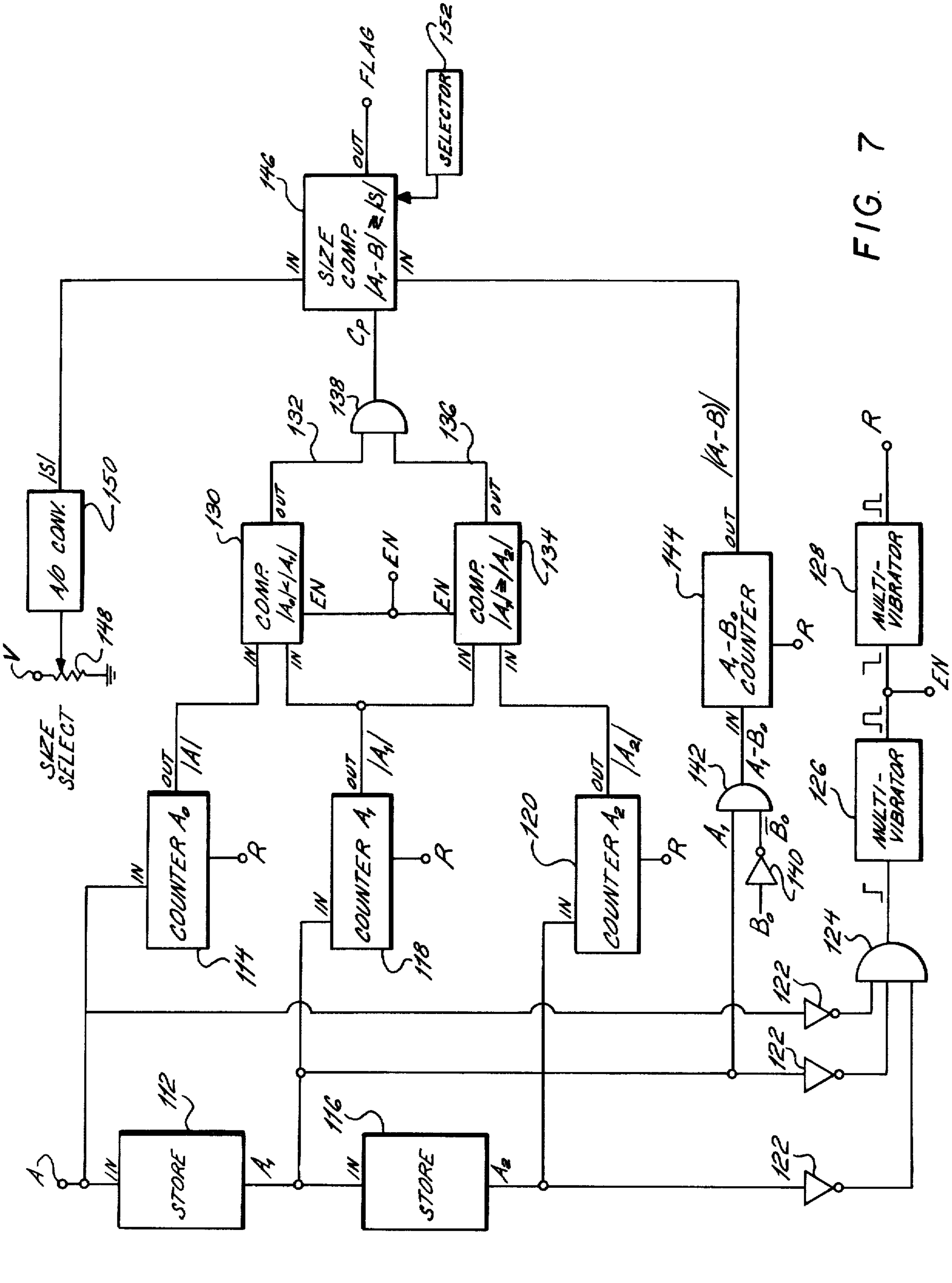
FIG. 7 is a schematic block diagram of the discriminator.

The foregoing discussion of the operation of the discriminator is carried out by means of the circuit shown in FIG. 7, and can be understood in conjunction with the pulse diagram shown in FIG. 8. The horizontal scan lines will proceed in sequence to scan an object and, as shown in FIG. 8A, three scan lines are shown in sequence designated 0, 1 and 2. The data A output will produce a pulse corresponding to the width of the total cell and the resulting pulses will be respectively $A_0$, $A_1$ and $A_2$ shown in FIGS. 8D, 8C and 8B, respectively. The data B pulse will only recognize the denser part of the cell, namely the nucleus, and will produce a narrower pulse designated $B_0$ as shown in 8E.

The data A input is sent to a first storage device 112, which can typically be a shift register having as many bits available (or some multiple thereof if the register is multiplexed) as there are clock pulses in the horizontal scan line. Thus, shift register 112 will store a complete horizontal scan line. Simultaneously, the data A signal will be sent to a counter 114 which will be enabled to count clock pulses during the time that a pulse is generated on that data A line. Thus, after a first horizontal scan line, all the digitized information occurring during the line scan will be stored in shift register 112. When a second horizontal scan line occurs, the information stored in shift register 112 will be shifted out and will now be stored in shift register 116. Simultaneously, the information from the first line will now be sent to counter 118. After a third horizontal scan line, the information is again shifted and information stored in shift register 116 will now be sent to counter 120.

The data on $A_0$, $A_1$, and $A_2$ are logically inverted by the inverters 122 and combined in a logical AND gate in order to provide a comparison enable pulse at the termination of the longest data pulse. The comparison enable pulse at the output of AND gate 124 is used to trigger a one shot multi-vibrator 126 which produces an output pulse EN shown in FIG. 8G as occurring immediately after the termination of the $A_1$ data pulse which is the data pulse that terminates last. The trailing edge of the enable pulse EN triggers a further one shot multi-vibrator 128 which generates a counter reset pulse R shown in FIG. 8H as occurring immediately following the enabling pulse EN.

The $A_0$ counter output from counter 114 and the $A_1$ counter output from counter 118 are compared in comparator 130 to determine if the count $|A_0|$ is less than the count $|A_1|$. When this condition is obtained, at the enabled time as controlled by the enable pulse, there will be an output from the comparator 130 on line 132. In a similar manner, the count $|A_1|$ from the counter 118 and the count $|A_2|$ from the counter 120 are compared in the comparator 134. When the count $|A_2|$ is less than or equal to the count $|A_1|$, at the time of the enable pulse EN, then the comparator 134 will provide an output on line 136. The output on line 136 from comparator 134 indicates that the size of the object is decreasing. The output on line 132 from the comparator 130 indicates that a maximum size has been reached. When both of these conditions occur, the outputs are gated through the gate 138 to provide a control pulse Cp. The control pulse Cp insures that a decision as to whether a cell should be counted or not will only be made after the size has reached a maximum and as the object is decreasing in size. This insures a single count for each cell detected.

Figure 8F:
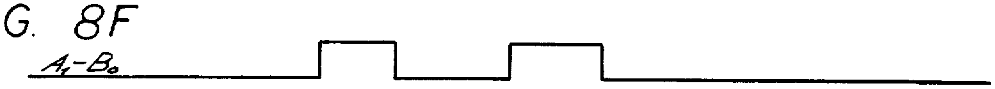
Figure 8G:
Figure 8H:
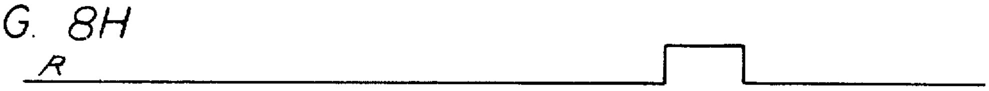
Figure 8I:

The output of data $A_1$ together with the inverted $B_0$ signal passing through the inverter 140, is logically ANDED by the AND gate 142 to provide a signal $A_1 - B_0$. This signal is sent to the counter 144 which counts during the enabling period of $A_1 - B_0$. The enable period may not, in fact, be continuous. The counter will nevertheless accumulate counts for the entire active period $A_1 - B_0$ although it may be discontinuous. FIG. 8F shows the $A_1 - B_0$ pulse and shows in fact that it does comprise two separate pulses.

The S cursor is selected by means of the voltage selector 148 whose voltage is converted to digital information by means of an A/D converter 150. The S cursor count is then compared with the $|A_1 - B_0|$ in the comparator 146 to determine whether the cell size is greater than or less than a preselected S cursor level. Selector 152 is utilized to control the comparator so that an output can either be obtained when the cell is less than or greater than the S cursor selected. The output from the size comparator will be the flag output signal which will be counted and which will cause an illuminating dot to be placed upon the cell that has thus been counted.

At the counter reset time, all of the counters are cleared and all comparisons are terminated. The system is then ready for the next period of data pulses. Utilizing the circuit of FIG. 7, the cell counter will be able to select sizes greater than or less than a predetermined size cursor and will select absorptions less than a preselected absorption cursor. In order to select absorptions greater than the preselected level, the A line is opened and the B line is directed through the A counting circuitry. Also, the input to inverter 140 is set to a logic low.

Thus, utilizing the circuitry heretofore defined, it is possible for an operator to select a size and absorption cursor which will set the size and absorption levels. Furthermore, the setting of these two variables provides four possible combinations of cell absorption and size and therefore four possible groups of cells which can be counted. The operator can also select which of these four groups should be counted. By adding a second absorption control circuit of the type shown in FIG. 4, it is possible to get another absorption threshold level into the system. The addition of another control would necessarily limit the range of either control so that neither one would overlap the other. However, by using a second absorption control, it is possible to permit six possible combinations of size and density groups of cells, as shown in FIG. 2B, wherein $D_1$ and $D_2$ are the two absorption cursors and 5 is the size cursor. In a similar manner, a second size A/D converter of the type 150, may be added allowing up to nine possible combinations of groups of cells to be counted, as shown in FIG. 2C, wherein the two size cursors are $S_1$ and $S_2$ and the two absorption cursors are $D_1$ and $D_2$.

The identification of a cell will be made by utilizing a standard 525 line television camera and the optical system of a microscope. The microscope can enable magnification of a scene through the usual range available in current microscopy. Each vertical field of the camera will consist of 262.5 horizontal scan lines. The camera will scan the scene on a 1 by 1 format thereby placing the circular field of view just within the scanned area of the camera's vidicon. Furthermore, the present system will divide each horizontal scan line into 512 equal parts. This will allow recognition of up to 256 objects per scan line. Each object will be identified by 1 count of the cell counter display and by an illuminated dot placed to the right and just below the center of the object on the monitor screen.

Although heretofore the counter has been described in connection with a cell, it is understood by this term to include not only objects in the field of cytology but also in the fields of histology and hematology, and other related fields which require such counts and identifications.

It is understood that a light pen could be added, as is known in the art, for manual intrusion into the automatic counting mode for the correction of a count caused by complex objects. Furthermore, a print-out unit can be utilized to obtain specimen identification and listing of the counts for each parameter explored. Furthermore, the arithmetic unit can be utilized to identify specific cells with an identification number.

There has been disclosed heretofore the best embodiment of the invention presently contemplated, however, it should be understood that various changes and modifications may be made thereto without departing from the spirit of the invention.

What I claim as new and desire to secure by Letters Patent is:

1. A cell counting apparatus for counting cells contained in a sample, comprising:

a. video means focused onto the sample for providing a video output of the sample as a sequence of horizontal scan lines;

b. level detector means receiving the video output from the video means and for each scan line, providing a first signal containing all of the quantized image information of the cells scanned on that line, and a second signal containing the quantized image information of the cells scanned on that line having absorptions greater than preselected absorption levels;

c. absorption selection means coupled to said level detector for setting said preselected absorption level;

d. discriminator means receiving said first and second signals from said level detector, providing therefrom a size and absorption information signal, comparing the last mentioned with preselected size levels, and in accordance with a preselected combination of size and absorption factors, producing a flag output in response to said comparison;

e. size selection means coupled to said discriminator means for setting said preselected size level;

f. counting means coupled to said discriminator means for counting the number of flag outputs produced; and g. timing control means for synchronizing the operation of said discriminator means with said video means.

2. The apparatus as in claim 1 and further comprising delay means receiving said video output from said video means and providing a delayed video output, summing amplifier means receiving said flag output and said delayed video output, and video display means coupled to said summing amplifier and displaying the delayed video output of the scanned sample together with a superimposed flag signal on each cell counted.

3. The apparatus as in claim 2 and further comprising electronic window selection means coupled to said timing control means and controlling said summing amplifier means and said counting means for reducing to a desired area the portion of the sample within which image information is flagged and counted, and area selection means coupled to said window selection means for presetting the desired area.

4. The apparatus as in claim 2 and further comprising a case having a control section and a display section, said display section including a video screen for displaying the scanned sample with its superimposed flag signal, and said control section having externally available adjustment knobs coupled respectively to said size select means and said absorption select means.

5. The apparatus as in claim 4 and further comprising a print-out section coupled to said display section for printing out information regarding the cell count.

6. The apparatus as in claim 1 and wherein said preselected size levels and said preselected absorption levels categorize all of the cells into a plurality of possible combinations of size and absorption, and further comprising group selection means for selecting one of the possible combinations of cells to be counted.

7. The apparatus as in claim 1 and further comprising arithmetic means coupled to said counting means for dividing the flag count by the number of fields received during a count window, output display means coupled to said arithmetic means for displaying the divided output, and keyboard means coupled to said arithmetic means for controlling the operation of said arithmetic means.

8. The apparatus as in claim 1 and wherein said timing control means further comprises a horizontal and vertical synchronizing generator coupled to said video means for controlling the horizontal and vertical scanning of the sample, clock means providing a series of clock pulses, and gating means coupled to said discriminator means for sending a predetermined number of said clock pulses to said discriminator means for each horizontal scan line.

9. The apparatus as in claim 1 further comprising microscope means coupled to said video means for obtaining a magnified image of the sample being scanned.

10. The apparatus as in claim 1 and wherein said level detector comprises an automatic clamping circuit receiving said video output and setting zero video at ground level, a peak detector circuit including in its output circuit a capacitor in parallel with a resistor and switching element, a first comparator for comparing the output of said peak detector circuit with the clamped video output and producing said first signal when said video output differs from said peak detector output, said first signal also controlling the operation of said switching element whereby said switching element normally operates in a first state wherein said peak detector output follows the video output, and wherein said switching element is changed to a second state when said first comparator produces said first signal whereby said peak detector operates to detect peak signals.

11. The apparatus as in claim 10 and further comprising a buffer circuit coupled between said peak detector output and said first comparator, for controlling the amount of the difference between said clamped video output and said peak detector output which is required to produce said first signal.

12. The apparatus as in claim 10 and further comprising a second comparator receiving a preselected portion of the peak detector output, comparing it with said clamped video output and producing said second signal, said preselected portion being determined by said absorption selection means.

13. The apparatus as in claim 1 and wherein said discriminator means includes storage means for storing the video information of a horizontal scan line, and first comparison means for comparing the quantized image information on a line by line basis, whereby sequential scan lines identifying the same cell will only produce a single flag output.

14. The apparatus as in claim 13 and wherein said discriminator means further comprises subtraction means for subtracting the quantized information contained in said second signal from the quantized information contained in said first signal, the result being said size information signal, and second comparison means for comparing said size information signal with said preselected size level.

15. The apparatus as in claim 14 and wherein said first comparison means produces a control signal only when the quantized image information indicates that the scanning has passed the maximum cell size and that the size of the cell being scanned is decreasing, said control signal enabling the operation of said second comparison means.

16. The apparatus as in claim 15 and further comprising cell selection means coupled to said comparison means for selecting the flag output from said second comparison means in accordance with the desired comparison result.

17. The apparatus as in claim 15 and wherein said storage means includes first and second sequentially coupled shift registers, each shift register capable of storing one complete horizontal scan line.

18. The apparatus as in claim 17 and wherein said first comparison means includes first counter means receiving the quantized video information from the level detector, second counter means receiving the quantized video information from the output of said first shift register, and third counter means receiving the quantized video information from the output of said second shift register, whereby the three counters respectively contain the quantized image information of one object simultaneously, a first comparator receiving the output of said first and second counters and providing an output when the value of said second counter is greater than the value of said first counter, a second comparator receiving the outputs of said second and third counters and producing an output when the value of the third counter is equal to or less than the value of the second counter, and first gating means enabled by the output of both said first and second comparators, the output of said first gating means being said control signal.

19. The apparatus as in claim 18 and further comprising second gating means receiving as its input the same inputs feeding all of said three counters, and providing an output enable pulse at the termination of the last occurring quantized image information, said output enable pulse enabling the operation of said first and second comparators.

20. The apparatus as in claim 19 and further comprising reset means coupled to said counters, said reset means activated by the trailing edge of said output enable pulse.

* * * * *